United States Patent [19]
Herrmeyer

[11] Patent Number: 5,465,531
[45] Date of Patent: Nov. 14, 1995

[54] VEHICLE DOOR UPPER ASSEMBLY

[75] Inventor: Dennis C. Herrmeyer, Paola, Kans.

[73] Assignee: Rigid Form, Inc., Paola, Kans.

[21] Appl. No.: 146,939

[22] Filed: Nov. 1, 1993

[51] Int. Cl.$^6$ .................................................. E06B 3/32
[52] U.S. Cl. .................................................. 49/463; 49/413
[58] Field of Search ............................ 49/502, 463, 464, 49/466, 125, 413; 296/146.2, 146.16

[56] References Cited

U.S. PATENT DOCUMENTS

| | | |
|---|---|---|
| 2,119,803 | 6/1938 | Brown . |
| 2,567,153 | 9/1951 | Jackson et al. . |
| 3,087,537 | 4/1963 | Le Van .................................. 49/413 X |
| 3,490,176 | 1/1970 | Danois .................................. 49/413 X |
| 3,526,996 | 9/1970 | Fraleigh et al. ...................... 49/413 X |
| 3,982,783 | 9/1976 | Vermeulen . |
| 4,322,132 | 3/1982 | Derr . |
| 4,644,699 | 2/1987 | Chandler et al. . |
| 4,730,413 | 3/1988 | Henry . |
| 4,850,139 | 7/1989 | Tiesler . |
| 4,920,698 | 5/1990 | Friese et al. . |
| 4,995,195 | 2/1991 | Olberding et al. . |

FOREIGN PATENT DOCUMENTS

| | | | |
|---|---|---|---|
| 2210918 | 9/1973 | Germany | ................................ 49/463 |

*Primary Examiner*—Peter M. Cuomo
*Assistant Examiner*—Jerry Redman
*Attorney, Agent, or Firm*—Litman, McMahon and Brown

[57] ABSTRACT

A vehicle door upper assembly is provided for removable mounting on a vehicle door lower assembly, and comprises a body subassembly, a window subassembly and a connecting subassembly. The body subassembly includes outer and inner panels interconnected by a panel spacer and includes a window opening bounded by a window pocket. The window subassembly includes a track mounted within the window pocket and outer and inner windowpanes slidably received in the window pocket. The connecting subassembly includes a structural rod mounting L-shaped pins with legs depending downwardly from the body subassembly and removably received in pin receivers or stake pockets formed in the vehicle door lower assembly.

19 Claims, 2 Drawing Sheets

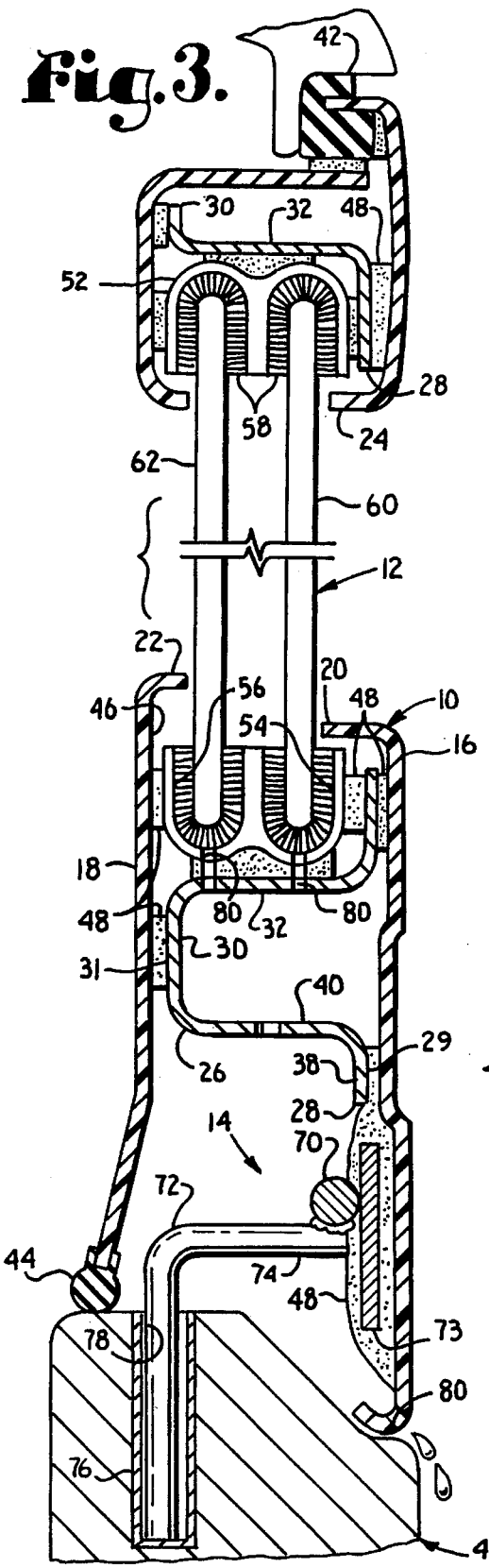
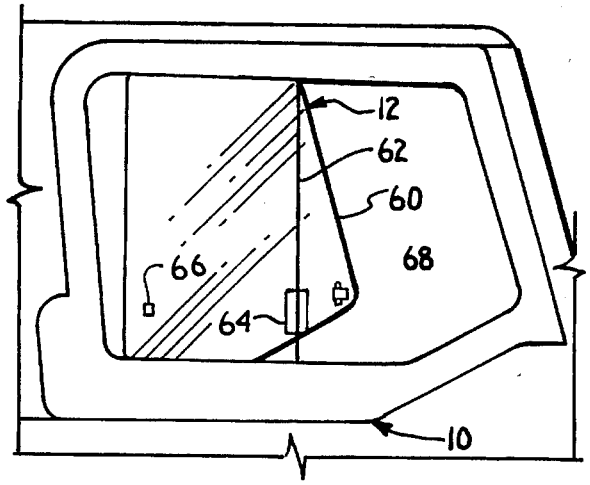
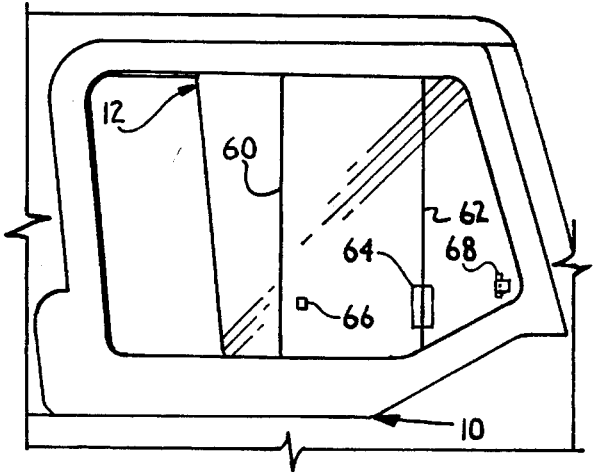

5,465,531

1

VEHICLE DOOR UPPER ASSEMBLY

BACKGROUND OF THE INVENTION

1. Field of the Invention

The present invention relates generally to vehicle doors, and in particular to a vehicle door upper assembly for removable mounting on a vehicle door lower assembly.

2. Description of the Prior Art

Various types of vehicles are designed for use with their doors, or parts thereof, removed during operation. Moreover, the tops of such vehicles are often removable. For example, vehicles intended for off-road and sport/utility use are often designed with removable doors and tops to facilitate ingress and egress.

However, such vehicles are normally equipped with doors and windows for use in inclement weather. Conventional vehicle doors with roll-up and power windows are generally unsuited for such convertible operation because they tend to be relatively heavy and thus difficult to remove and replace. Moreover, complete door-and-window units could be susceptible to damage if frequently removed and replaced.

A partial solution to these problems is to provide flexible side curtains in lieu of door-and-window combinations. Side curtains can be used in conjunction with "soft" tops. However, removable hard tops can provide significant advantages. The vehicle door upper assembly of the present invention addresses the need for a separately removable door upper assembly which provides superior weather protection and durability as compared to side curtains made of flexible material and which is adapted for use with removable hard tops.

SUMMARY OF THE INVENTION

In the practice of the present invention, a vehicle door upper assembly is provided for removable mounting on a vehicle door lower assembly, and generally comprises body, window and connecting subassemblies. The body subassembly includes inner and outer panels interconnected by a panel spacer. A window opening is formed in the body subassembly and is surrounded by a window pocket formed between the panels and the spacer. The window subassembly includes a track mounted in the window pocket and outer and inner windowpanes slidably received in the track. The connecting subassembly includes a structural rod mounted between the outer and inner panels and a plurality of L-shaped pins. Each pin includes a generally horizontal leg mounted on the structural rod and vertical leg depending downwardly from the body subassembly. The vehicle door lower assembly includes pin receivers or stake pockets which receive the vertical legs of the pins for mounting the vehicle door upper assembly on the lower assembly. The window and body subassemblies include drain passages for draining water therefrom.

OBJECTS AND ADVANTAGES OF THE INVENTION

The principal objects and advantages of the present invention include providing a vehicle door upper assembly for removable mounting on a vehicle door lower assembly; providing such an assembly which can be designed with an appearance consistent with that of the vehicle door lower assembly; providing such an assembly which can provide a relatively weather-tight enclosure for the vehicle cab; providing such an assembly which is relatively easy to remove; providing such an assembly which is adapted for use with a hard top; and providing such an assembly which includes windowpanes which are independently slidable with respect to each other.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a cross-sectional view of the door taken generally along line 3—3 in FIG. 2.

FIG. 4 is a side elevational view with a window outer pane slid rearwardly.

FIG. 5 is a side elevational view with a window inner pane slid forwardly.

DETAILED DESCRIPTION OF THE PREFERRED EMBODIMENTS

Figure 1:
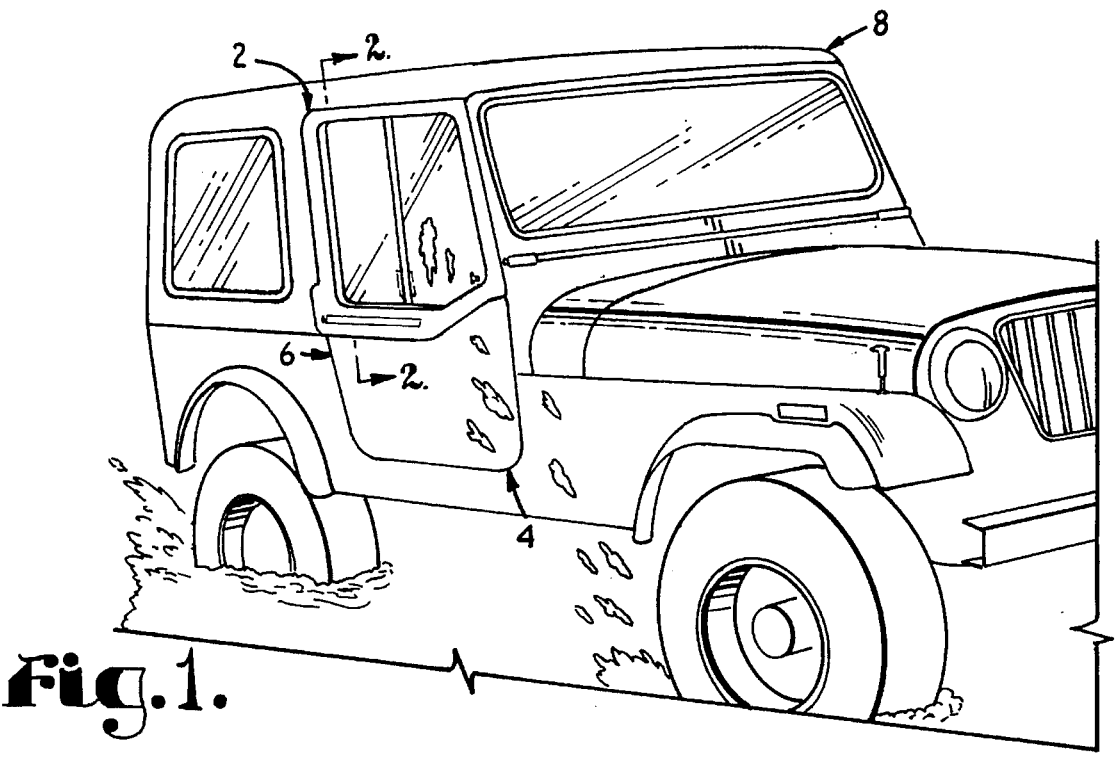
FIG. 1 is a perspective view of a vehicle with a door upper assembly embodying the present invention, shown mounted on a door lower assembly.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Introduction and Environment

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a vehicle door upper assembly embodying the present invention and adapted for mounting on a vehicle door lower assembly 4 to form a door 6 for a vehicle 8 (FIG. 1). The door upper assembly 2 generally comprises a body subassembly 10, a window subassembly 12 and a connecting subassembly 14.

II. Body Subassembly 10

The body 10 includes outer and inner panels 16, 18 each having a respective panel opening 20, 22. The panel openings 20, 22 are generally aligned to form a window opening 24.

A panel spacer 26 generally surrounds the window opening 24 and interconnects the outer and inner panels 16, 18 in spaced relation (FIG. 3). The panel spacer 26 includes outer and inner flanges 28, 30 at spacer outer and inner faces 29, 31 interconnected by a spacer web 32.

Figure 2:
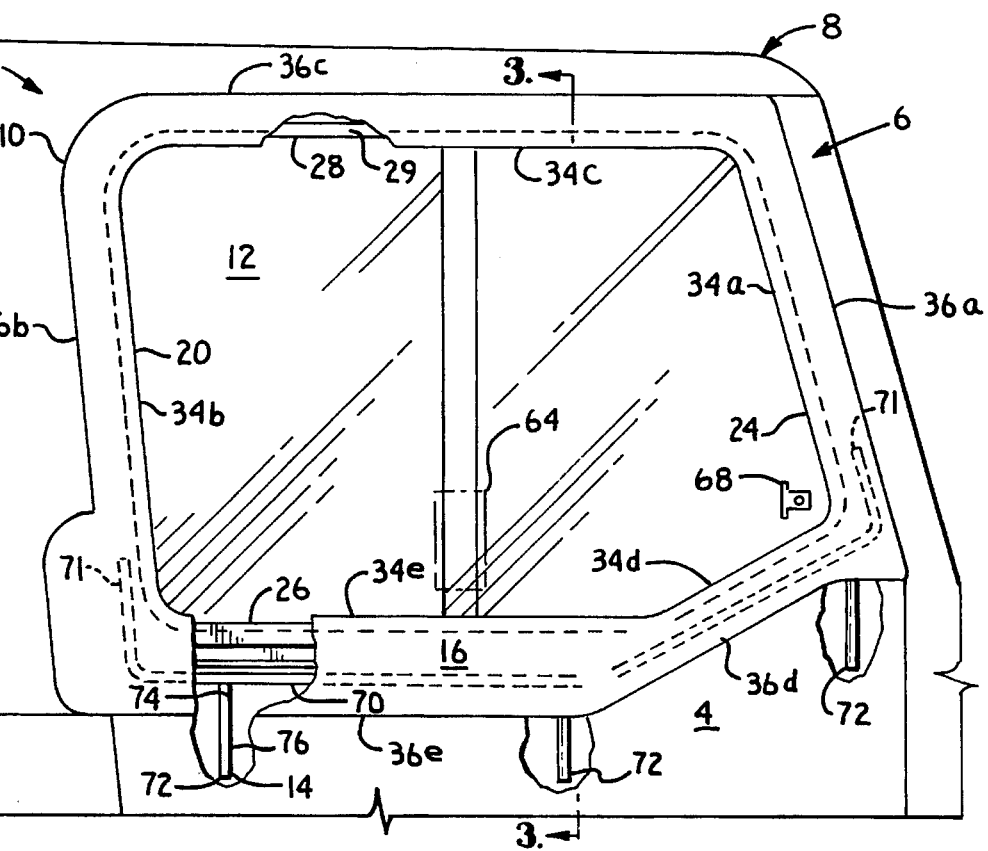
FIG. 2 is a side elevational view of the door upper assembly taken generally along line 2—2 in FIG. 1.

As shown in FIGS. 2, 4 and 5, the body 10 generally has the configuration of a five-sided frame enclosing the window opening 24 and defining front, rear, upper, lower front and lower rear sections 34a–e respectively, which sections have respective edges 36a–e.

Along the lower rear body section 34e, the panel spacer 26 includes a stiffener flange 38 mounted on the outer panel 16 and a stiffener web 40. The body 10 is provided with an outer gasket 42 which interconnects the outer and inner panels 16, 18 along the front, rear, and upper edges 36a–c and with an inner gasket 44 mounted on the inner panel 18 along the lower front and lower rear edges 34d and 34e for engaging the vehicle door lower assembly 4.

The panels 16, 18 and the spacer subassembly 26 form a window pocket 46 which generally surrounds the window opening 24 and is open thereto.

The panels 16, 18 and the panel spacer 26 can be connected to each other by any suitable means, such as mechanical fasteners or suitable adhesive, the latter being shown at 48. The adhesive 48 can comprise, for example, urethane, cryogenic adhesive, pressure sensitive adhesive (e.g., double-sided tape), fiber reinforced plastic or any other adhesive suitable for bonding the respective materials.

III. Window Subassembly 12

The window subassembly 12 includes a track 52 generally surrounding the window opening 24 and mounted on the spacer 32 within the window pocket 46. The track 52 forms outer and inner channels 54, 56 which open towards the window opening 24 and are lined with respective sliding gasket means 58, which can comprise, for example, felt.

Outer and inner windowpanes 60, 62 are slidably received in the outer and inner channels 54, 56 respectively. A latch assembly 64 is mounted on the inner windowpane 62 and selectively engages a catch 66 for locking the window subassembly 12 in a closed position thereof (FIG. 2). A window pull 68 is mounted at the front of the outer windowpane 60 which facilitates sliding same.

The window track 52 can comprise any suitable material, such as vinyl, rubber or steel, and can be mechanically or adhesively fastened to the body subassembly 10 by any suitable means, including the exemplary adhesives discussed above.

As shown in FIGS. 4 and 5, the windowpanes 60, 62 permit a degree of independent, sliding adjustment. In their closed positions (FIG. 2), the outer windowpane 60 is positioned forward and the inner windowpane 62 is positioned rearward. The outer windowpane can be slid rearwardly (FIG. 4) and the inner windowpane 62 can be slid forwardly (FIG. 5).

IV. Connecting Subassembly 14

The connecting subassembly 14 removably interconnects the vehicle door upper and lower assemblies 2, 4, and generally comprises a structural member 70 which can comprise, for example, a steel pipe or rod mounting a plurality of plates 73 which are suitably fastened to the outer panel 16 by flexible adhesive 48, such as urethane. The structural rod 70 extends in directions which are generally parallel to the lower front and lower rear edges 36d, 36e. The structural rod 70 has upturned end sections 71 which extend partway into the body front and rear sections 34a, 34b.

A plurality (e.g., three are shown) of L-shaped pins 72 each includes an upper, generally horizontal leg 74 fixedly attached to the structural rod 70 and a lower, generally vertical leg 76 depending downwardly from the lower edges 34d, 36e and removably received in pin receivers or stake pockets 78 formed in the door lower assembly 4. With the door upper assembly 2 mounted on the door lower assembly 4, the flexible adhesive 48 can resiliently retain the door upper assembly 2 in place in the vehicle door opening and can dampen shocks and vibrations associated with vehicle travel.

The door upper assembly 2 is designed for self-draining by means of a series of drain passages 80 formed in the track 52 in each channel 54, 56 thereof, in the spacer webs 32, 40 and in the outer panel 16 along the lower front and lower rear edges 36d, 36e thereof.

It is to be understood that while certain forms of the present invention have been illustrated and described herein, it is not to be limited to the specific forms or arrangement of parts described and shown.

What is claimed and desired to be secured by Letters Patent is as follows:

1. A vehicle door upper assembly for removable mounting on a vehicle door lower assembly, which comprises:
    (a) an outer panel including an outer panel opening;
    (b) an inner panel including an inner panel opening generally aligned with said outer panel window opening;
    (c) a window opening in said door upper assembly formed by said inner and outer panel opening;
    (d) window means in said window opening;
    (e) a panel spacer including an outer face mounting said outer panel and an inner face mounting said inner panel;
    (f) upper, lower, front and rear edges;
    (g) door assembly connecting means at said lower edge for removably connecting said door upper assembly to said door lower assembly and for rigidly cantilevering said door upper assembly from said door lower assembly, said door assembly connecting means including a pin comprising a separate component from said panels and said panel spacer, said pin being fixedly connected to one of said panels and depending downwardly from said lower edge, said connecting means further including a receiver formed in said vehicle door lower assembly and selectively receiving said pin;
    (h) said window means including a track having outer and inner channels being mounted on said panel spacer; and
    (i) said window means further including outer and inner windowpanes each slidably received in a respective track channel.

2. The invention according to claim 1 wherein said panel spacer includes:
    (a) outer and inner flanges at said spacer subassembly outer and inner faces respectively and a spacer web connecting said outer and inner flanges.

3. The invention according to claim 1 wherein said door assembly connecting means comprises a mounting pin depending downwardly from said lower edge and selectively received in said door lower assembly.

4. The invention according to claim 3 wherein said door assembly connecting means includes a structural rod connected to said mounting pin.

5. The invention according to claim 1 wherein said outer panel, said inner panel and said panel spacer are adhesively fastened together.

6. The invention according to claim 5 wherein said outer panel, said inner panel and said panel spacer are fastened together by urethane.

7. The invention according to claim 5 wherein said outer panel, said inner panel and said panel spacer are fastened together by pressure sensitive adhesive.

8. The invention according to claim 5 wherein said outer panel, said inner panel and said panel spacer are fastened together by fiber reinforced plastic.

9. The invention according to claim 5 wherein said outer panel, said inner panel and said panel spacer are fastened together by cryogenic adhesive.

10. A vehicle door upper assembly for removable mounting on a vehicle door lower assembly, which door upper assembly includes:

(a) an outer panel and an outer panel opening;

(b) an inner panel and an inner panel opening generally aligned with said outer panel opening;

(c) a window opening formed by said outer and inner panel openings;

(d) a panel spacer generally surrounding said window opening and including outer and inner flanges mounted on said outer and inner panels respectively and a web interconnecting said outer and inner flanges;

(e) a track mounted on said spacer web and generally surrounding said window opening, said track including inner and outer channels open towards said window opening;

(f) outer and inner windowpanes slidably received in said outer and inner channels respectively;

(g) upper, lower, front and rear edges; and (h) door assembly connecting means including:

(1) a structural rod extending generally along said door lower assembly lower edge and mounted on one of said outer and inner panels; and (2) a plurality of connecting pins each connected to said structural rod and depending downwardly from said lower edge and selectively received in said door lower assembly.

11. The invention according to claim 10 wherein said outer panel, said inner panel and said panel spacer are adhesively fastened together.

12. The invention according to claim 11 wherein said outer panel, said inner panel and said panel spacer are fastened together by urethane.

13. The invention according to claim 11 wherein said outer panel, said inner panel and said panel spacer are fastened together by pressure sensitive adhesive.

14. The invention according to claim 11 wherein said outer panel, said inner panel and said panel spacer are fastened together by fiber reinforced plastic.

15. The invention according to claim 11 wherein said outer panel, said inner panel and said panel spacer are fastened together by cryogenic adhesive.

16. The invention according to claim 10 wherein said panel spacer, said track and said outer panel include drain passages.

17. The invention according to claim 10 which includes:

(a) an outer gasket connecting said outer and inner panels and an inner gasket mounted on said inner panel for engagement with said vehicle door lower assembly.

18. The invention according to claim 10 wherein said connecting means includes a plate mounted on said structural rod and flexible adhesive mounting said plate on one of said outer and inner panels.

19. The invention according to claim 18 wherein said flexible adhesive comprises urethane.

* * * * *